July 17, 1962 E. AHRENS ET AL 3,045,206

SUBMARINE SONIC DEVICE

Filed Dec. 23, 1958 2 Sheets-Sheet 1

United States Patent Office 3,045,206
Patented July 17, 1962

3,045,206
SUBMARINE SONIC DEVICE
Erhard Ahrens, Kiel, Johannes Schultes, Kitzeberg, near Kiel, and Arno Mies and Walter Kriebel, Kiel, Germany, assignors to Electroacustic G.m.b.H., Kiel, Germany, a corporation of Germany
Filed Dec. 23, 1958, Ser. No. 782,418
Claims priority, application Germany Mar. 11, 1958
14 Claims. (Cl. 340—3)

Our invention relates to a submarine sonic device for use by divers.

It has heretofore been necessary to accurately locate from aboard ship an object to be investigated or worked on by a diver so that the diver can be let down in the immediate vicinity of that object. It may readily happen, however, that the object is missed considerably, especially in deepsea work when the diver is connected with the ship only by a telephone cable. In such cases the diver's sight is often obscured in the water so that the proper location cannot be found even with the aid of portable floodlights. When working under water it may also happen that the telephone cable breaks thus interrupting the diver's connection with the ship. So far it has been infeasible for freely floating divers, or aqualung fish hunters, to communicate with the ship personnel or with each other, or to find the fish or other targets in turbid waters.

It is an object of our invention to obviate the above-mentioned shortcomings and to provide a sonic device that permits a diver to orient himself, to locate objects and to communicate sonically with the ship or with other divers, independently of visibility conditions.

According to the invention, we provide a portable submarine sonic device which comprises a water-tight and pressure-sealed housing wherein a complete and self-sufficient echo sounding apparatus with an optical indicator and an electric current source is mounted, preferably together with a compass and a level indicator, the enclosed devices being controllable by means of adjusting members that extend through sealed openings of the housing to the outside and are manually accessible to the diver.

With the aid of such a submarine device the diver can determine by echo sounding his depth beneath the sea level or his height above the sea bottom and can locate any objects to be found, such as wrecks, or fish. The same device can also be used for the transmission of communication by ultrasonics between diver and ship, or with other divers, it being only necessary for this purpose to actuate the echo-pulse transmitter by hand, for example, in accordance with the Morse code, while the periodically operating keyer of the echo sounding equipment is disconnected. The same device also permits the transmission of signals by on-and-off switching of the entire echo sounding device, including the periodic keyer.

The water-tight and pressure-resistant housing of the submarine device can be given tubular shape, the electroacoustic transducer being mounted on one end of the tube and the cathode-ray tube of the sounding equipment on the other end. The current source and the electronic circuitry of the echo sounding equipment, comprising the keying means, the sonic pulse generator, and the receiving amplifier, are mounted between the transducer and the tube. The housing wall of the device in front of the viewing screen of the tube consists of glass or transparent plastic, such as known under the trade name Plexiglas. A compass and a spherical level are mounted on the housing, preferably on that portion of the tubular wall which is on top when using the device for echo sounding in a horizontal position. The compass and level are preferably provided with a lamp for illuminating them in the water.

According to further features of the invention, one or two handles are mounted on the housing for carrying and manipulating it underwater. The controls of the sonic device, such as a main switch for switching the device on and off, a manual control for adjusting the brightness of the picture on the viewing screen of the tube, a manual control for adjusting the echo sounding range, as well as a manual control for keying the echo pulse transmitter by hand when the automatic periodic keyer is disconnected, extend from within to the outside of the housing through water-tight seals and are preferably located in the vicinity or directly on the above-mentioned handles.

The electric current source, such as a dry battery, is preferably accommodated within a separate chamber of the housing and is covered by a pressure-resistant closure that can readily be opened without special tools, thus facilitating replacement of the current source.

According to another feature of the invention, the housing of the submarine sonic device has essentially the shape of a sphere, an oval body or a streamlined body.

According to still another feature of the invention, an observation of the viewing screen of the cathode-ray tube in very turbid water is facilitated by placing a water-tight viewing tube in front of the viewing window of the housing. The viewing tube may have a length of approximately 25 cm. in accordance with the most favorable spacing of the viewing screen from the eye. The viewing tube is filled either with air or with clear, transparent liquid.

For giving the entire portable device minimum or no weight under water, the housing may be provided with one or more floating tanks which can be filled or emptied by pumping or by air-pressure in known manner. The tanks are preferably so arranged that when weight and buoyancy of the device are in balance, the mass gravity center coincides with the center of buoyancy. As a result, the device tends to retain any position in which it is placed until the position is changed by the diver.

Means may be provided that permit the diver to attach the device to his body so that he can freely use his hands when working under water.

According to another feature of the invention, the entire submarine sonic device is accommodated within a diver's helmet so designed that the indication of the echo sounding equipment appears at a favorable distance and in a favorable position relative to the diver's eyes while the diver's view into surrounding water space is obstructed as little as possible.

It is further preferable to mount stabilizing surfaces on the housing of the sonic device to facilitate use of the device by freely floating divers.

The foregoing and other objects, advantages and features of our invention will be more fully apparent from the examples of submarine sonic devices according to the invention illustrated on the drawings and described below. On the drawings.

Figure 1:
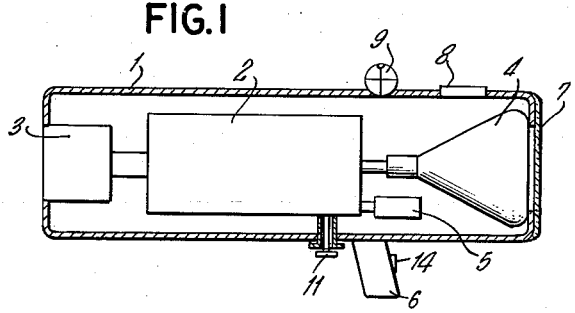
FIG. 1 is a partly sectional side view of a sonic device with a tubular housing.
Figure 2:
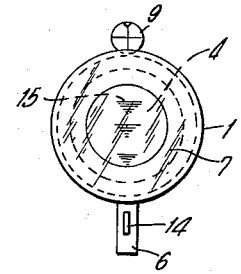
FIG. 2 is a front view, and FIG. 3 s a top view of the same device except for some modifications.
Figure 3:
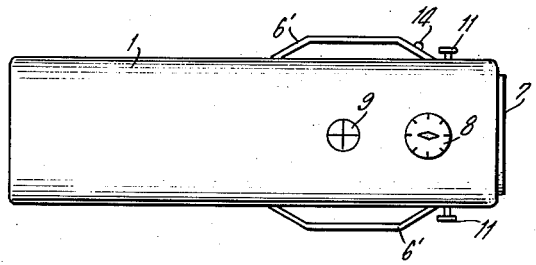

The device illustrated in FIGS. 1, 2 and 3 has a tubular housing 1 in which an electronic unit 2 is mounted between an electroacoustic transducer 3 and a cathode-ray tube 4, all of these components being hermetically sealed by and within the housing. The transducer 3 serves as a sonic transmitter as well as sonic receiver, available magnetostrictive transducers being suitable for such purposes. The unit 2 comprises the electronic components namely a pulse generator (PG in FIG. 8) for issuing a pulse to the transducer 3 thus operating it as a transmitter, a sweep generator (SG in FIG. 8) for the cathode-ray tube 4, and an amplifier (AM in FIG. 8) for amplifying the echo signal received by the transducer 3 and applying it to the lateral deflector electrodes of the tube 4. The electronic components are preferably provided with transistors in order to minimize space requirements and permitting an economic operation from the current source 5 such as a dry battery.

Mounted on the top of the housing 1 are a compass 8 and a spherical level 9. Mounted on the bottom side of the housing is a handle 6 by means of which the device can be manipulated under water with one hand. Located in front of the handle 6 are the knobs for setting the component devices of the sonic equipment.

In FIG. 1, as well as in FIGS. 3 to 6, all such control knobs are designated by the same reference numeral 11. It should be understood, however, that a number of differently functioning knobs are usually needed such as those denoted by 11a to 11f in FIG. 8. Two or three of them may be mounted together in concentric relation to each other.

The handle 6 carries a push-button switch 14 by means of which the echo sounder can be switched or keyed manually with or without simultaneous operation of the automatic keying device located in unit 2 and described below with reference to FIG. 8. The viewing screen of the tube 4 is observable through a window 7 of glass or transparent plastic, such as Plexiglas.

An example of an image as it may be seen on the viewing screen of tube 4 during echo sounding operation is shown in FIG. 2. The viewing screen, visible through the window 7, shows a number of indications 15 revealing the presence of objects at distances apparent from the location of the indications along the vertical axis of the viewing screen.

With the aid of the above-described device the diver can readily determine the position of an object being sounded, for example, a wreck, a school of fish, or the ship from which the diver descended, by determining on the spherical level the inclination of the device, determining the direction with the aid of the compass, and reading on the viewing screen of the tube the distance of the object.

While FIG. 3 is essentially a top view of a device according to FIGS. 1 and 2, it also shows the following modifications. Instead of the handle 6 according to FIGS. 1 and 2, the device in FIG. 3 is provided with two lateral handles 6', and the above-mentioned control switch 14 is located in one of these lateral handles. The control knobs 11 for setting the electric components of the sonic equipment are mounted in the vicinity of the handles 6', all knobs having their shafts pass through water-tight and pressure-resistant seals of the housing.

Figure 4:
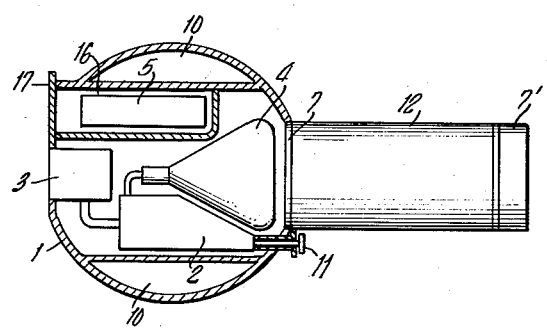
FIG. 4 shows a partly sectional side view of another device with a substantially spherical housing.

The device according to FIG. 4 has a spherical housing 1 which comprises the same components 2, 3, 4 and 5, as described above with reference to FIGS. 1, 2 and 3. The device is additionally equipped with float chambers 10 which can be flooded or emptied by pressure, or in any other suitable manner. A water-tight and preferably removable viewing tube 12, filled with air or clear liquid, is attached to the housing 1 in front of window 7 to permit observing the viewing screen of tube 4 in turbid water. The tube 12 has a front window portion 7'. Its length is preferably about 25 cm. which corresponds to the most favorable spacing of the eye from the viewing screen of tube 4. The housing 1 is further provided with a chamber 16 which is sealed from the remaining interior of the housing and serves for accommodating the current source 5. Chamber 16 is covered by a water-tight closure 17 which can readily be opened without the use of special tools. As a result, the dry battery serving as a current source can easily be exchanged from the outside.

In order to reduce the overall length of the device, the above-described viewing tube 12 in front of the viewing screen of the picture tube may be substituted by an optical lens system which provides a virtual image at the most favorable distance from the diver's eye.

Figure 5:
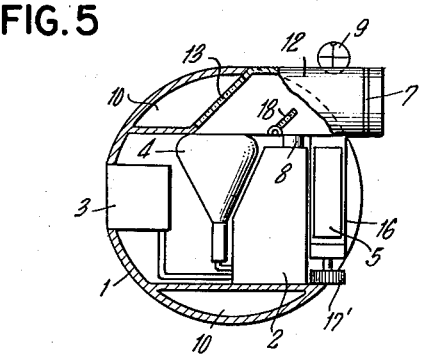
FIG. 5 is a partly sectional view of a third embodiment with a generally spherical housing.
Figure 6:
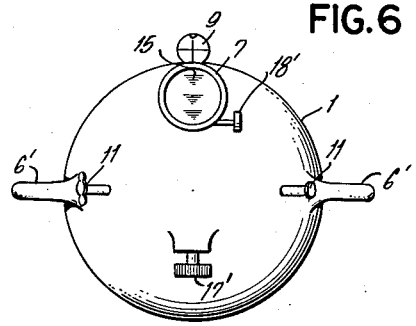
FIG. 6 is a side view of the same device.

The device illustrated in FIGS. 5 and 6 is generally similar to that of FIG. 4 but is given a shortened overall length by changing the arrangement of the cathode-ray tube 4. The viewing screen of tube 4 is observable through window 7 by means of an inclined mirror 13. The compass 8, mounted within the housing, is observable through window 7 with the aid of another mirror 18 preferably so pivoted to its support that it can be tilted by means of an exterior knob 18' from the illustrated active position downwardly to a place where it does not obscure the mirror 13. An example of how the image on the viewing screen of tube 4 may appear to the observer is illustrated in FIG. 6 where one of the echo signals is denoted by 15.

The housing 1 is provided with two lateral handles 6' in whose vicinity the manually operable control knobs 11, 11 are located. The battery 5 is located within a separate chamber as described above with reference to FIG. 4 and is sealed by means of a removable cover that can be mounted or removed with the aid of a fastening bolt carrying a knob 17'. The illustrated location of the manual control knobs 11 is such, and their respective shapes so differ from each other, that they can readily be distinguished from each other by feel and thus can be properly manipulated in the dark. As mentioned, the compass and the level are preferably illuminated from the current source 5 to permit using them in the dark.

Figure 7:
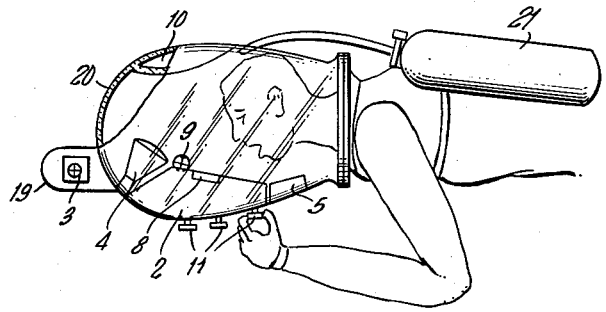
FIG. 7 illustrates schematically and partly in section a sonic device forming part of equipment built into a diver's helmet.

According to FIG. 7, the sonic device is built into the helmet of an aqualung diver. The viewing screen of the cathode-ray tube 4, the compass 8, and the spherical level 9 are located within the field of vision of the diver. The transducer 3 is pivotally mounted in a protruding portion 19 of the helmet structure so that it can be turned by manipulation from the outside in order to permit the diver to take soundings in different directions, for example upwardly or downwardly, without placing his body into the respective directions. One of the windows of the helmet is denoted by 20, it being understood that most of the helmet is transparent and that the device is mounted in a position where any obstruction of the diver's view toward the front is a minimum. The device also permits the diver to conduct wireless telephony under water in the audible or ultrasonic range.

Instead of providing the above-described devices with a single electroacoustic transducer, two or more such transducers may be used. For example, two transducers of mutually perpendicular radiating directions may be built into the device to be selectively operated individually or simultaneously so that the transducers permit taking alternating or simultaneous echo soundings in the forward direction and in the upward or downward direction.

In a manner analogous to the device described with reference to FIG. 7, a submarine sonic device according to the invention may be mounted in, or combined with, any other type of diver's helmet, and in each case may be adapted as regards shape and mounting location to the particularities of the equipment.

Figure 8:
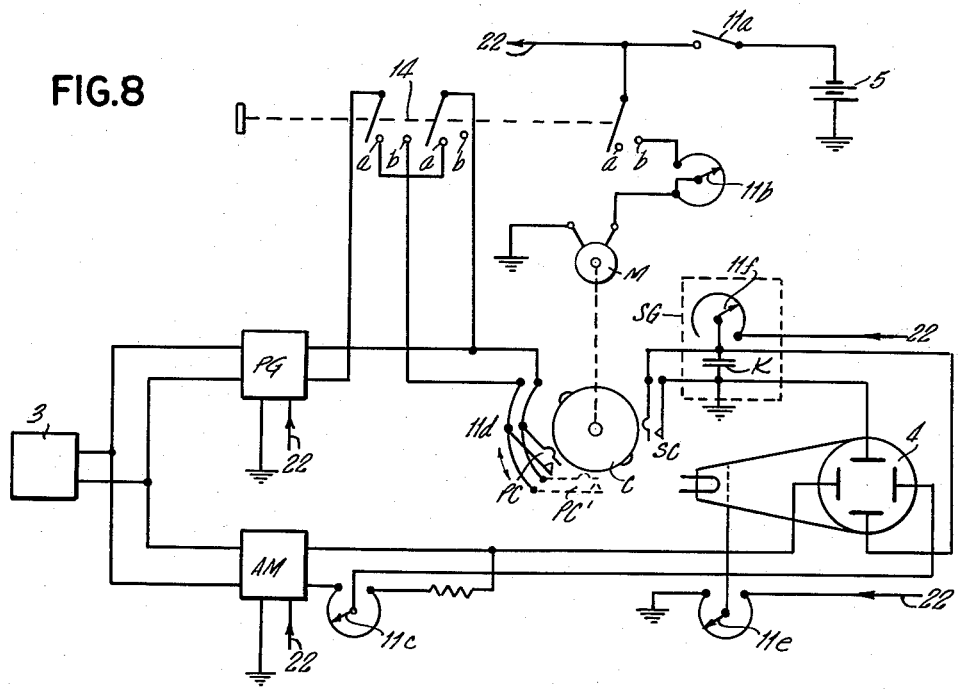
FIG. 8 is a schematic circuit diagram of a submarine sonic device applicable with any of the preceding embodiments.

The circuit diagram according to FIG. 8, applicable with any of the devices described above, illustrates the components of the electric unit 2 (FIGS. 1, 4, 5, 7) and their connection with the sonic transducer, the tube, and the manual control members.

The transducer 3, operating as sonic transmitter and receiver, is connected to a pulse generator PG which provides the pulses to be transmitted, and is also connected with an amplifier AM for the received pulses. The unit further comprises a sweep generator SG which, when triggered by a contact SC, impresses sweep voltage across the vertically spaced deflector electrodes of tube 4. The issuance of pulses from pulse generator PG to transducer 3 is controlled by a pulse contact PC. The components PG, SG and AM are energized from the battery 5 through a lead 22 when an on-off contact 11a is closed.

It should be understood that the contact 11a, as well as the components designated 11b to 11f and described below, are all manually adjustable by the various exteriorly accessible control members generally denoted by 11 in FIGS. 1 to 7.

The pulse contact PC and the sweep trigger contact SC are controlled by a rotatable cam C driven from a motor M which is also energized through contact 11a from the battery 5. The speed of motor M is controllable by means of a manually adjustable rheostat 11b. The position of pulse contact PC relative to trigger contact SC can be varied by manual displacement of a manual control member schematically indicated by 11d. For example, the pulse contact PC can thus be placed from the full-line position to the broken-line position denoted by PC'. In this manner the recurrent transmitting moment of transducer 3 is shifted relative to the periodic actuation of the sweep trigger contact SC. Since the trigger contact SC, when momentarily actuated, places the picture tube 4 into ready condition, the image produced on the viewing screen of the picture tube 4 represents a given partial sounding range, and this partial range can be shifted by manual actuation at 11d within the total sounding range available.

The amplifier AM has its output circuit connected through a potentiometer 11c across the horizontal deflector electrodes of the tube 4. The manually actuable slider of the rheostat permits varying the amplitude of the received pulses. Another manually adjustable rheostat 11e is connected with the control grid of tube 4 to permit varying the grid voltage for controlling the brightness of the image on the viewing screen.

The sweep generator SC is shown to consist essentially of a simple R-C combination formed by a manually controllable resistor 11f and a capacitor K. The capacitor K is discharged through the trigger contact SC at the beginning of each sweep interval and is subsequently recharged from battery 5 through rheostat 11f and lead 22. The voltage pulses issuing from sweep generator SG to the vertical deflector electrodes of tube 4 are essentially saw-tooth shaped. Resistor 11f permits adjusting the sweep speed for respectively different sounding ranges or partial ranges to be indicated on the viewing screen of tube 4.

The switch 14 which, as described, is preferably mounted in the handle 6 (FIG. 1) of the device, is normally spring-biased to maintain the position illustrated in FIG. 8. By temporarily depressing the switch 14 so that its respective contacts are temporarily engaged with the fixed contacts denoted by a, the pulse generator PG can be keyed at will in order to issue code signals from the transducer 3. By placing the switch 14 into the position denoted by b, the automatic keying device comprising the motor M, the cam C and the contacts PC and SC are placed in operation for continuous echo sounding. If desired, the on-off switch 11a of the device can be controlled by, or otherwise combined with, the switch 14. Thus, by closing and opening the contacts 14a, the transducer 3 performs as an ultrasonic coded communication transmitter independent of the periodic keying device. The transducer 3 may also transmit signals by On and Off switching of the entire echo sounding device, including the periodic keyer.

It will be understood from the foregoing that when the switch 14 is in position b the device operates as an echo sounder in the following manner. The pulse contact PC, closed periodically in equal intervals of time by rotation of cam C, causes the pulse generator PG to issue an electric pulse to transducer 3 which is translated into a sonic pressure pulse. When thereafter an echo is received by transducer 3, the echo signal is amplified by the amplifier AM and impressed upon the horizontal deflector electrodes of tube 4. Shortly after the closing of pulse contact PC, the trigger contact SC is closed at a moment dependent upon the selected setting of the pulse contact PC. The contact SC, triggering the sweep generator SG, places tube 4 in condition of readiness. An echo signal received during the ready interval of tube 4 produces on the viewing screen an image which is indicative of the reflecting object and its distance.

It will be understood to those skilled in the art, upon a study of this disclosure, that our invention permits of various modifications relative to design and arrangement of the components and relative to circuitry, without departing from the essential features of our invention and within the scope of the claims annexed hereto.

We claim:

1. A submarine sonic device for use by divers, comprising a portable water-tight and pressure-sealed housing, a complete and self-sufficiently operative echo sounding apparatus mounted within said housing and comprising an optical indicator and a current source, said sounding apparatus having manually adjustable mechanical control members, and water-tight seals through which said control members pass from within to the outside of said housing to permit manual adjustment under water.

2. A submarine sonic device for use by divers, comprising a portable water-tight and pressure-sealed housing, optical means in said housing for indicating the instantaneous position of the device including a compass and a level indicator, an echo sounder mounted in said housing, said echo sounder comprising an optical indicator and a current source and having manually adjustable mechanical control members, and water-tight seals through which said control members pass from within to the outside of said housing to permit manual adjustment under water.

3. A submarine sonic device for use by divers, comprising a portable water-tight housing, a self-sufficient echo sounding apparatus mounted in said housing and comprising electrosonic transducer means, an optical indicator, a periodic keying device connected with said transducer and with said indicator from echo sounding operation, and a current source for energizing said transducer means and indicator and keying device, and manual mechanical control means manipulatable from the outside of said housing and comprising a manually actuable keying contact electrically connected with said transducer means for operating it as a communication transmitter independently of said periodic keying device.

4. In a portable submarine device according to claim 1, said housing having float chambers for controlling the buoyancy of the device.

5. A submarine sonic device for use by divers, comprising a substantially cylindrical water-tight housing, a sonic transducer mounted on one axial end of said housing, a cathode-ray tube mounted in said housing and having a viewing screen at the other end of said housing, an echo sounding assembly mounted in said housing between said tube and said transducer, said assembly having a periodic keying device electrically connected with said transducer for issuing sonic pulses and electrically connected with said tube for visual indication of echo pulses on said screen, and manually actuatable mechanical control means for controlling said assembly, said control means being accessible from the outside of said housing.

6. A submarine sonic device for use by divers, comprising a water-tight housing having exterior handle means for carrying and manipulating the housing and having float chambers for weight reduction under water, a sonic transducer mounted in said housing, a cathode-ray picture tube mounted in said housing and having a viewing screen observable from the outside of said housing, a self-powered echo sounding system including said transducer and said tube, said system having a periodic keying device mounted in said housing and having manual mechanical control means extending from within to the outside of said housing.

7. In a submarine device according to claim 6, said control means comprising a selector switch connected with said keying means and with said transducer for selectively operating the device as an echo sounder and as a communication transmitter, respectively.

8. In a submarine sonic device according to claim 6, said housing having generally spherical shape, said handle means comprising two grips mounted on said housing on opposite sides respectively thereof, and said manual control means being exteriorly accessible in the vicinity of said grips.

9. A submarine sonic device according to claim 6, comprising a water-tight tubular extension attached to said housing in front of said viewing screen, and a window covering the end of said extension, said extension having an axial length of approximately 10 inches from said screen to afford viewing said screen in turbid water.

10. In a submarine sonic device according to claim 6, said manual control means comprising a switch for disconnecting said periodic keying device from said transducer, and a manual keying contact connected with said transducer independently of said periodic keying device for controlling said transducer to issue communication signals.

11. In a submarine sonic device according to claim 6, said self-powered system comprising a battery for energizing said transducer and tube and keying device, said housing having a water-tight chamber sealed from the rest of the housing interior and having a removable cover sealing the chamber toward the outside and rendering the chamber accessible when the cover is removed, said battery being exchangeably mounted in said chamber.

12. A submarine sonic device for use by divers, comprising a diver's helmet, a complete and self-sufficiently operative echo sounding apparatus mounted within said helmet and comprising an optical indicator and a current source, said sounding apparatus having manually adjustable mechanical control members, and water-tight seals through which said control members pass from within to the outside of said helmet to permit manual adjustment by the diver under water.

13. In a submarine sonic device according to claim 12, said indicator comprising a cathode-ray tube having a viewing screen located in said helmet within the diver's field of vision, optical means in said helmet for indicating the instantaneous position of said device including a compass and a level gauge also mounted in said helmet within said field of vision.

14. In a submarine sonic device according to claim 12, said sounding apparatus comprising an electrosonic transducer pivotally mounted on said helmet and having means accessible from the outside for turning said transducer to a desired directional position relative to said helmet.

References Cited in the file of this patent

UNITED STATES PATENTS

| | | |
|---|---|---|
| 2,060,670 | Hartman | Nov. 10, 1936 |
| 2,418,846 | Meacham | Apr. 15, 1947 |
| 2,433,971 | Adams | Jan. 6, 1948 |
| 2,453,502 | Dimmick | Nov. 9, 1948 |
| 2,710,388 | Chun | June 7, 1955 |
| 2,762,031 | Fryklund | Sept. 4, 1956 |
| 2,983,900 | Devol | May 9, 1961 |

FOREIGN PATENTS

| | | |
|---|---|---|
| 775,441 | Great Britain | May 22, 1957 |